US012731054B2

(12) United States Patent
Li et al.

(10) Patent No.: US 12,731,054 B2
(45) **Date of Patent: *Sep. 8, 2026**

(54) REINFORCEMENT LEARNING USING A RELATIONAL NETWORK FOR GENERATING DATA ENCODING RELATIONSHIPS BETWEEN ENTITIES IN AN ENVIRONMENT

(71) Applicant: GDM Holding LLC, Mountain View, CA (US)

(72) Inventors: Yujia Li, London (GB); Victor Constant Bapst, London (GB); Vinicius Zambaldi, London (GB); David Nunes Raposo, London (GB); Adam Anthony Santoro, London (GB)

(73) Assignee: GDM Holding LLC, Mountain View, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/168,123

(22) Filed: Feb. 13, 2023

(65) Prior Publication Data

US 2023/0196146 A1 Jun. 22, 2023

Related U.S. Application Data

(63) Continuation of application No. 16/417,580, filed on May 20, 2019, now Pat. No. 11,580,429.

(Continued)

(51) Int. Cl.
*G06N 5/043* (2023.01)
*G06F 17/16* (2006.01)

(Continued)

(52) U.S. Cl.
CPC ............. *G06N 5/043* (2013.01); *G06F 17/16* (2013.01); *G06N 3/0464* (2023.01); *G06N 3/092* (2023.01); *G06N 7/01* (2023.01)

(58) Field of Classification Search
CPC ............ G06N 3/006; G06N 3/04; G06N 3/08; G06N 3/045; G06N 3/0464; G06N 3/0475;

(Continued)

(56) References Cited

U.S. PATENT DOCUMENTS

2006/0155664 A1 7/2006 Morikawa et al.
2015/0306761 A1* 10/2015 O'Connor ............ G05D 1/0221 700/250

(Continued)

FOREIGN PATENT DOCUMENTS

CN 108027897 5/2018
WO WO 2017/004626 1/2017
WO WO 2018/083671 5/2018

OTHER PUBLICATIONS

Mishra et al., "A Simple Neural Attentive Meta-Learner," arXiv (Feb. 2018) (Year: 2018).*

(Continued)

*Primary Examiner* — Kakali Chaki
*Assistant Examiner* — Kevin L. Smith
(74) *Attorney, Agent, or Firm* — Fish & Richardson P.C.

(57) ABSTRACT

A neural network system is proposed, including an input network for extracting, from state data, respective entity data for each a plurality of entities which are present, or at least potentially present, in the environment. The entity data describes the entity. The neural network contains a relational network for parsing this data, which includes one or more attention blocks which may be stacked to perform successive actions on the entity data. The attention blocks each include a respective transform network for each of the entities. The transform network for each entity is able to transform data which the transform network receives for the entity into modified entity data for the entity, based on data for a plurality of the other entities. An output network is (Continued)

arranged to receive data output by the relational network, and use the received data to select a respective action.

18 Claims, 6 Drawing Sheets

Related U.S. Application Data

(60) Provisional application No. 62/673,806, filed on May 18, 2018.

(51) Int. Cl.
*G06N 3/0464* (2023.01)
*G06N 3/092* (2023.01)
*G06N 7/01* (2023.01)

(58) Field of Classification Search
CPC .. G06N 3/0495; G06N 3/0499; G06N 3/0895; G06N 3/09; G06N 3/091; G06N 3/092; G06N 3/094; G06N 3/096; G06N 3/098; G06N 3/0985; G06N 3/0455; G06N 5/043; G06N 7/01; G06F 17/16
See application file for complete search history.

(56) References Cited

U.S. PATENT DOCUMENTS

| | | | | |
|---|---|---|---|---|
| 2017/0024643 | A1* | 1/2017 | Lillicrap | G06N 3/045 |
| 2017/0032245 | A1 | 2/2017 | Osband et al. | |
| 2018/0060301 | A1 | 3/2018 | Li et al. | |
| 2018/0373997 | A1 | 12/2018 | Duan et al. | |
| 2019/0070735 | A1* | 3/2019 | Tappeiner | G10L 17/00 |
| 2019/0258925 | A1* | 8/2019 | Li | G06F 16/583 |
| 2019/0266489 | A1 | 8/2019 | Hu et al. | |

OTHER PUBLICATIONS

Chen et al., "PixelSNAIL: An Improved Autoregressive Generative Model," arXiv (2017)) (Year: 2017).*
Finn et al., "Meta-Learning and Universality: Deep Representations and Gradient Descent Can Approximate Any Learning Algorithm," arXiv (2018) (Year: 2018).*
U.S. Appl. No. 62/524,183, filed Jun. 23, 2017, Salakhutdinov et al.
Battaglia et al., "Interaction networks for learning about objects, relations and physics," arXiv, Dec. 2016, 12 pages.
Battaglia et al., "Relational inductive biases, deep learning, and graph networks," arXiv, Oct. 2018, 40 pages.
Bello et al., "Neural combinatorial optimization with reinforcement learning," arXiv, Jan. 2017, 15 pages.
Chen et al., "Iterative visual reasoning beyond convolutions," arXiv, Mar. 2018, 10 pages.
Choi et al., "Multi-Focus Attention Netowrk for Efficient Deep Reinforcement Learning," AAAI (2017) (Year: 2017).
Dai et al., "Learning combinatorial optimization algorithms over graphs," arXiv, Feb. 2018, 24 pages.
Denil et al., "Programmable agents," arXiv, Jun. 2017, 15 pages.
Driessens et al., "Integrating guidance into relational reinforcement learning," Machine Learning, 2004, 34 pages.
Driessens et al., "Relational instance based regression for relational reinforcement learning," Twentieth Internaional Conference on Machine Learning, 2003, 8 pages.
Duan et al., "One-Shot Imitation Learning," (2017) (Year: 2017).
Dzeroski et al., "Relational reinforcement learning," Machine Learning, 2001, 46 pages.
Espeholt et al., "Impotance weighted actor-learning architecture: Scalable distributed deep-rl with importance weighted actor-learner architectures," arXiv, Jun. 2018, 22 pages.
Garnelo et al., "Towards deep symbolic reinforcement learning," arXiv, Oct. 2016, 13 pages.
Guez et al., "Learning to search with metsnets," arXiv, Jul. 2018, 12 pages.
Hamrick et al., "Metacontrol for adaptive imagination-based optimization," arXiv, May 2017, 21 pages.
He et al., "Identity mappings in deep residual networks," arXiv, Jul. 2016, 15 pages.
Hu et al., "Relation networks for object detection," arXiv, Jun. 2018, 11 pages.
Jaderberg et al., "Population based training of neural networks," arXIv, Nov. 2017, 21 pages.
Kansky et al,, "Schema networks: Zero-shot transfer with a generative causal model of intuitive physics," arXiv, Aug. 2017, 10 pages.
Kataoka et al., "Anticipating Traffic Accidents with Adaptive Loss and Large-Scale Incident DB," Apr. 8, 2018 (Year: 2018).
Kipf et al., "Semi-supervised classification with graph convolutional networks," arXiv, Feb. 2017, 14 pages.
Kool et al., "Attention solves your tsp," arXiv, Mar. 2018, 10 pages.
Lake et al., "Building machines that learn and think like people," arXiv, Nov. 2016, 58 pages.
Lei Ba et al., "Layer normalization," arXiv, Jul. 2016, 14 pages.
Im et al., "Distance-based Self-Attention Network for Natural Language Inference," Dec. 6, 2017.
Marcel Binz, "Learning Goal-Directed Behaviour," Degree Project in Computer Science and Eng'g (2017) (Year: 2017).
Mishra et al., "A simple neural attentive meta-learner," arXiv, Feb. 2018, 17 pages.
Mnih et al., "Human-level control through deep reinforcement learning," Nature, 2015, 13 pages.
Mottaghi et al., 'What happens if . . . ', Learning to Predict the Effect of Forces in Images, (2016) (Year: 2016).
Muggleton et al,, "Inductive logic programming: Theory and methods," The Journal of Logic Programming, 1994, 51 pages.
Niepert et al., "Learning convolutional neural networks for graphs," arXiv, Jun. 2016, 10 pages.
Office Action in European Appln. No. 19727314.7, dated Feb. 20, 2023, 13 pages.
Otterlo, "Relational representations in reinforcement learning: Review and open problems," Brandeis, 2002, 8 pages.
Parisotto et al., "Neural Map: Structured Memory for Deep Reinforcement Learning," Carnegie Mellon University (2017) (Year: 2017).
Pascanu et al., "Learning model-based planning from scratch," arXiv, Jul. 2017, 13 pages.
PCT International Preliminary Report on Patentability in International Appln. No. PCT/EP2019/062912, dated Nov. 24, 2020, 14 pages.
PCT International Search Report and Written Opinion in International Appln. No. PCT/EP2019/062912, dated Aug. 28, 2019, 19 pages.
Per-Arne Andersen, "Deep Reinforcement Learning using Capsules in Advanced Game Environments," University of Agder (Thesis, Jan. 2018) (Year: 2018).
Raposo et al., "Discovering objects and their relations from entangled scene representations" arXiv, Feb. 2017, 16 pages.
Rusu et al., "Sim-to-real robot learning from pixels with progressive nets," arXiv, May 2018, 9 pages.
Santoro et al., "A simple neural network module for relational reasoning," Advances in enural information processing systems, 2017, 10 pages.
Scarselli et al., "The graph neural network model," IEEE Transactions on Neural Networks, 2009, 22 pages.
Seo et al., "Bi-Directional Attention Flow for Machine Comprehension," Feb. 24, 2017 (Year: 2017).
Silver et al., "Mastering the game of go with deep neural networks and tree search," Nature, Jan. 2016, 20 pages.
Vaswani et al., "Attention is all you need," arXiv, Dec. 2017, 15 pages.
Vezhnevets et al., "Feudal networks for hierarchical reinforcement learning," arXiv, Mar. 2017, 12 pages.
Vinyals et al., "Starcraft ii: a new challenge for reinforcement learning," arXiv, Aug. 2017, 20 pages.

(56) References Cited

OTHER PUBLICATIONS

Wang et al., "Nervenet: Learning Structured Policy with Graph Neural Networks," ICLR, 2018, 26 pages.
Wang et al., "Non-local neural networks," arXiv, Apr. 2018, 10 pages.
Watters et al., "Visual interaction networks," arXiv, Jun. 2017, 14 pages.
Weber et al., "Imagination-augmented agents for deep reinforcement learning," arXiv, Feb. 2018, 20 pages.
Zambaldi et al., "Relational Deep Reinforcement Learning," arXiv, Jun. 5, 2018, 15 pages.
Zhang et al., "A study on overfitting in deep reinforcement learning," arXiv, Apr. 2018, 25 pages.
Zhao et al., "Deep Reinforcement Learning with Visual Attention for Vehicle Classification," IEEEE (2017) (Year: 2017).
Office Action in Chinese Appln. No. 201980032397.3, dated Dec. 26, 2023, 26 pages (with English translation).
Office Action in Chinese Appln. No. 201980032397.3, dated May 24, 2024, 22 pages (with English translation).
Notice of Allowance in Chinese Appln. No. 201980032397.3, dated Sep. 14, 2024, 6 pages (with English translation).

* cited by examiner

REINFORCEMENT LEARNING USING A RELATIONAL NETWORK FOR GENERATING DATA ENCODING RELATIONSHIPS BETWEEN ENTITIES IN AN ENVIRONMENT

CROSS-REFERENCE TO RELATED APPLICATION

This application is a continuation of U.S. application Ser. No. 16/417,580, filed on May 20, 2019, which claims priority to U.S. Provisional Application No. 62/673,806, filed on May 18, 2018. The disclosure of the prior applications are considered part of and are incorporated by reference in the disclosure of this application.

BACKGROUND

This specification relates to reinforcement learning. In particular it relates to a neural network system for selecting actions for an agent to perform in an environment potentially containing multiple entities, and to methods performed by the neural network systems.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that selects actions to be performed by a reinforcement learning agent interacting with an environment. In order for the agent to interact with the environment, the system receives data ("state data") characterizing the current state of the environment and selects an action to be performed by the agent in response to the received data. Data characterizing a state of the environment will be referred to in this specification as an observation.

One innovative aspect of the subject matter described in this specification can be expressed as a neural network system for reinforcement learning including an input network for extracting, from state data, respective entity data for each a plurality of entities which are present, or at least potentially present, in the environment. The entity data describes the entity. The neural network contains a relational network for parsing this data, which includes one or more "attention blocks" which may be stacked to perform successive actions on the entity data. The attention blocks each include a respective transform network for each of the entities. The transform network for each entity is able to transform data which the transform network receives for the entity into modified entity data for the entity, based on data for a plurality of the entities (i.e., not just entity data for the entity corresponding to the transform network, but for a plurality of the entities, or even all the entities). An output network is arranged to receive data output by the relational network, and use the received data to select a respective action (e.g., an action from a predefined space of possible actions).

The modified entity data produced by the transform network for a first of the entities, using entity data for the corresponding plurality of the entities, can thus represent information within the state data relating to the interaction of the first entity with the plurality of entities. When the neural network system is trained, this causes an architectural bias which results in the relational network learning relationships between the entities.

Each transform network may comprise one or more "head sections", and an adaptive network for generating the modified entity data using the outputs of the head section(s). Each attention block may transform each set of entity data into at least one value vector. Optionally, there may be a respective value vector for each head section (i.e., if the number of head sections per transform network is h, then h value vectors may be produced). The head sections of each transform network may weight the corresponding value vector by respective attention weights, and sum them.

If there are h head sections per transform network, the value vectors may be produced using h value networks of the attention block. Each value network may for example apply a linear projection (linear transformation) to any given set of entity data it receives. For a given value network, the linear transformation may be the same irrespective of which entity the entity data relates to, but the value networks produce different respective linear transformations.

The head section may generate the respective attention weights for each set of entity data by generating respective salience values, and then combining the salience values in a non-linear way. In this way, it can increase the highest salience value relative to the other salience values. The salience value produced by the head section corresponding to a given first entity, using the entity data for a given second entity, is a measure of the importance of the information in the state data relating to both the first and second entities. The attention weights emphasize the highest one of these measures, and thus emphasize the corresponding value vector in the output of the head section.

One function which may be used to combine the salience values is a soft-max function. This has the advantage of being a differentiable function, which is helpful when the neural network system is trained. However, following the training it would be possible to replace the differentiable function with another function, e.g., one which sets all salience values but the highest to zero.

For each entity, the attention block may generate h query vectors by inputting the respective entity data to h respective query networks. Likewise, for each entity the attention block may generate h key vectors by inputting the respective entity data to h respective key networks. To generate the salience values for the respective plurality of entities, the head section for a given entity may multiply the query vector for the given entity with the respective key vectors. The result may be normalized by a normalization factor which is a function of the number of components in the query vector and key vector (which is typically the same).

Each query network and each value network may apply a respective linear transformation to the entity data it receives. The linear transformation each query network performs is the same irrespective of which entity the entity data relates to. Similarly, the linear transformation each key network performs is the same irrespective of which entity the entity data relates to.

As noted above, the transform network for a given entity operates on entity data for a plurality of the entities. The plurality of entities may include the entity itself. This is referred to as "self attention", and may be useful for example to generate an action which involves only a single one of the entities.

As noted above, each transform network may comprise an adaptive network, such as a multi-layer perceptron, for transforming the outputs of the head sections to generate output data for the attention block (i.e., modified entity data for the entity corresponding to the transform network). The outputs of the head sections may be concatenated and optionally added to the entity data for the corresponding entity received by the transform network.

Certain embodiments of the invention are particularly useful for tasks in environments for which the state data is defined by arrays of pixels. The state data includes one or more values for each pixel. In such cases, the input network of the neural network system may comprise at least one convolutional layer. In the case of multiple convolutional layers, they may be stacked, so as to pass data successively between them in a certain layer order.

The entities may correspond to different respective subsets of the environment (possibly overlapping subsets), which may be spatially displaced relative to each other. For example, one of the convolutional layers (the last in the order) may be arranged to generate, for each cell of an array of cells, at least one feature value. The array of cells typically has the same number of dimensions as the array of pixels. The cells may correspond to the entities. Thus, for each entity, the respective entity data may be at least one feature value of the corresponding cell. Note that this means that the head section for each entity receives entity data for cells which are in different respective positions within the array of cells (e.g., for all cells of the array). Thus, the head section can do a "non-local" computation, in which it takes into account data which is dependent upon state data for substantially the whole of the array of pixels. For many tasks it is believed that an agent which is controlled based on non-local computations will be better suited to computing relations between entities than agents which only employ more explicitly local computations, such as translation invariant convolutions. The entity data for a given one of the cells may comprise data indicative of the position of the corresponding cell in the array of cells.

In one form, the convolutional layer(s) (and in particular the last convolutional layer if there are a plurality of convolutional layers) generates a plurality of feature values for each cell. Optionally, corresponding feature values for different ones of the cells may form respective sets of feature values (e.g., a first set of feature values comprises a first feature value from a first of the cells, and the other feature values of the first set of feature values are the respective first feature value from other cells), and these sets of feature values may be transmitted to the relational network successively. The respective outputs of the relational network for the sets of feature values may optionally be combined in the output layer, e.g., using a feature-wise max pooling layer.

For certain tasks, and especially ones in which rewards depend on the state of a system many time steps after an action is taken, the neural network system may benefit from including at least one recurrent layer, such that the action which the neural network system selects at any time step is dependent not just on the most recently received state data, but also upon state data from earlier time steps. In one form, the recurrent layer may be a layer of long-short-term-memory (LSTM) units ("a LSTM layer"); for example, it may be a convolutional LSTM layer.

While the output layer may take many forms, it may comprise a rectified linear unit (reLU). The output layer may be trained to select a single action. Alternatively, it may be configured to generate a policy defining a distribution of respective probability values for each action of a space of possible actions. The training may involve a policy gradient method. Additionally, the output layer may be trained to generate a baseline value. The baseline value is of use during the training of the policy network to modify a cost function used in the policy gradient method.

Additionally, the output layer may be trained to generate one or more action-related argument values, which may be transmitted to the agent to modify how the agent performs an action selected by the policy network. For example, the action-related argument values may comprise at least one respective value for each of a plurality of locations (e.g., areas) within the environment, and in this case may be used to influence how an action selected based on the policy is performed in that area.

Note that the entities need not correspond to respective portions of the environment. For example, instead, the neural network system might be used to perform a task relating to responding to an order or a question (e.g., a verbal order/question) about the environment, e.g., relating to objects which may or may not be present in the environment and which may constitute the entities. The task might be specified using a feature plane which encodes the order/question. If the environment is a home location, the action may include controlling a household robot.

The neural network system may be implemented in a distributed architecture, such as the Imapla architecture.

A further innovative feature of the invention relates to the production of the neural network system by training each of the input layer, relational network and output layer, using training data, for example using a policy gradient method. The training procedure may train the input layer, relational network and output layer concurrently, based on rewards generated from the state data and indicative of the success of the agent in performing a task. In particular, the training of the relational network involves training the value networks, the query networks and the key networks, and it has been found that in this process the salient features of the relationships between the entities are naturally emphasized.

The innovative aspects of the present specification may be expressed in terms of the neural network system, or the method which the neural network system performs to select actions based on state data, or the method which is used to train the neural network system. The method can alternatively be expressed in terms of a computer system which is configured to perform one of the methods, or as computer storage media storing instructions that when executed by one or more computers cause the one or more computers to perform the operations of one of the methods.

The subject matter described in this specification can be implemented in particular embodiments so as to realize one or more of the following advantages. First, the neural network can control the agent to perform the task with greater success than some known RL systems. This is particularly true for environments for which the state data is pixel data (e.g., intensity data at respective pixels), and/or for tasks requiring interaction between multiple entities at respective spaced apart locations within the environment. From another point of view, this increase in performance efficiency makes possible a reduction in training time and/or memory requirement compared to a known system which performs the same task with the same accuracy.

Furthermore, during the training of the neural network system, the relational model learns to identify entities, and in particular relationships between the entities, directly from the state data. This means that it is unnecessary to define a task in which the agent operates on objects, by specifying an entity-based language, and requiring the neural network system to interpret commands in that language to control the agent. Instead, the neural network system learns the relevant objects and their relations directly from the input space. The relational model is operative to generate data which characterizes the state data in a way which is informed by these relations, such that the output network is able to generate an action based on them. We have demonstrated in experiments that this results in a neural network system which is operative to perform certain tasks with a very high degree of success, compared to other techniques and in some cases compared to human control of the agent. In particular, the neural networks, when trained to perform tasks in an environment including certain objects, exhibited a high capacity to generalize such that in use they were able to successfully perform other tasks involving similar objects, including more complex tasks and tasks including sub-goals which were not used during the training procedure.

In this specification, for a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The details of one or more non-limiting examples of the subject matter of this specification are set forth in the accompanying drawings and the description below. Other features, aspects, and advantages of the subject matter will become apparent from the description, the drawings, and the claims.

DETAILED DESCRIPTION

Figure 1:
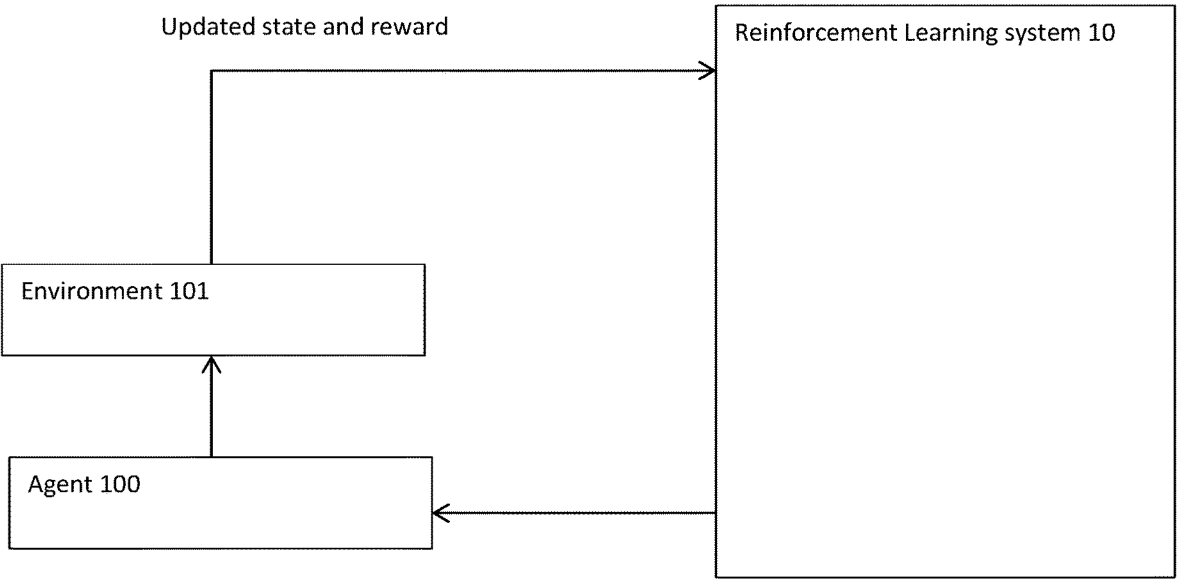
FIG. 1 illustrates an example reinforcement learning system for training an agent to interact with an environment.

The implementations described herein relate to reinforcement learning systems.

In broad terms a reinforcement learning system is a system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment is referred to in this specification as an observation. Optionally the observation at a time step may include data from a previous time step e.g., the action performed at the previous time step, a reward received at the previous time step, and so forth.

In some implementations, the environment is a real-world environment and the agent is an electromechanical agent interacting with the real-world environment. For example, the agent may be a robot or other static or moving machine interacting with the environment to accomplish a specific task, e.g., to locate an object of interest in the environment or to move an object of interest to a specified location in the environment or to navigate to a specified destination in the environment; or the agent may be an autonomous or semi-autonomous vehicle (e.g., land or air or sea vehicle) navigating through the environment.

In these implementations, the observations may include, for example, one or more of images, object position data, and sensor data to capture observations as the agent interacts with the environment, for example sensor data from an image, distance, or position sensor or from an actuator. In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations. For example in the case of a robot the observations may include data characterizing the current state of the robot, e.g., one or more of: joint position, joint velocity, joint force, torque or acceleration, and global or relative pose of a part of the robot such as an arm and/or of an item held by the robot. The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to control the robot, e.g., torques for the joints of the robot or higher-level control commands; or to control the autonomous or semi-autonomous land or air or sea vehicle, e.g., torques to the control surface or other control elements of the vehicle or higher-level control commands; or e.g., motor control data. In other words, the actions can include for example, position, velocity, or force/torque/acceleration data for one or more joints of a robot or parts of another mechanical agent. Action data may include data for these actions and/or electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g., steering, and movement e.g braking and/or acceleration of the vehicle.

In some implementations the environment is a simulated environment and the agent is implemented as one or more computers interacting with the simulated environment.

For example the simulated environment may be a simulation of a real-world environment, such as one including a robot or vehicle, and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle. A simulated environment can be useful for training a reinforcement learning system before using the system in the real world. In another example, the simulated environment may be a video game and the agent may be a simulated user playing the video game. Generally in the case of a simulated environment the observations may include simulated versions of one or more of the previously described observations or types of observations and the actions may include simulated versions of one or more of the previously described actions or types of actions.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug.

In some applications, the observations may include data from one or more sensors monitoring part of a plant or service facility such as current, voltage, power, temperature and other sensors and/or electronic signals representing the functioning of electronic and/or mechanical items of equipment. In some applications the agent may control actions in a real-world environment including items of equipment, for example in a facility such as: a data center, server farm, or grid mains power or water distribution system, or in a manufacturing plant or service facility. The observations may then relate to operation of the plant or facility. For example additionally or alternatively to those described previously they may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. For example the agent may control electrical or other power consumption, or water use, in the facility and/or a temperature of the facility and/or items within the facility. The actions may include actions controlling or imposing operating conditions on items of equipment of the plant/facility, and/or actions that result in changes to settings in the operation of the plant/facility e.g., to adjust or turn on/off components of the plant/facility.

In some further applications, the environment is a real-world environment and the agent manages distribution of tasks across computing resources e.g., on a mobile device and/or in a data center. In these implementations, the actions may include assigning tasks to particular computing resources. As further example, the actions may include presenting advertisements, the observations may include advertisement impressions or a click-through count or rate, and the reward may characterize previous selections of items or content taken by one or more users.

The reinforcement learning system may be implemented as one or more computer programs on one or more computers in one or more locations in which the systems, components, and techniques described herein are implemented.

FIG. 1 illustrates an example of a reinforcement learning system. The reinforcement learning system 10 generates output data which controls an agent 100. The generation of the output data can be based on what is termed a "policy". Each time an action is determined, the agent 100 performs it on an environment 101. The action updates a state of the environment 101. The updated state is returned to the reinforcement learning system 10 along with an associated reward for the action. These are used by the reinforcement learning system 10 to determine the next action. In general, the reward is a numerical value. The reward can be based on any event or aspect of the environment 101. For example, the reward may indicate whether the agent 100 has accomplished a task (e.g., navigating to a target location in the environment 30) or the progress of the agent 100 towards accomplishing a task.

The interaction of the agent 100 with the environment 101 over one or more time steps may be represented by a "trajectory" (i.e., sequence) of experience tuples, where each experience tuple corresponds to a respective time step. An experience tuple corresponding to a time step may include: (i) an observation characterizing the state of the environment at the time step, (ii) an action that was selected to be performed by the agent at the time step, (iii) a subsequent observation characterizing a subsequent state of the environment subsequent to the agent performing the selected action, (iv) a reward received subsequent to the agent performing the selected action, and (v) a subsequent action that was selected to be performed at the subsequent time step.

The policy defines how the system performs actions based on the state of the environment. As the system 10 is trained based on a set of experiences, the policy used to generate output data to generate actions to be followed by the agent 100, is updated by assessing the value of actions according to an approximate value function, or return function to improve the expected return from the actions taken by the policy. This is typically achieved by a combination of prediction and control to assess the success of the actions performed by the agent, sometimes referred to as the "return". The return is calculated based on the rewards received following a given action. For instance, the return might be an accumulation of multiple reward values over multiple time steps.

Figure 2:
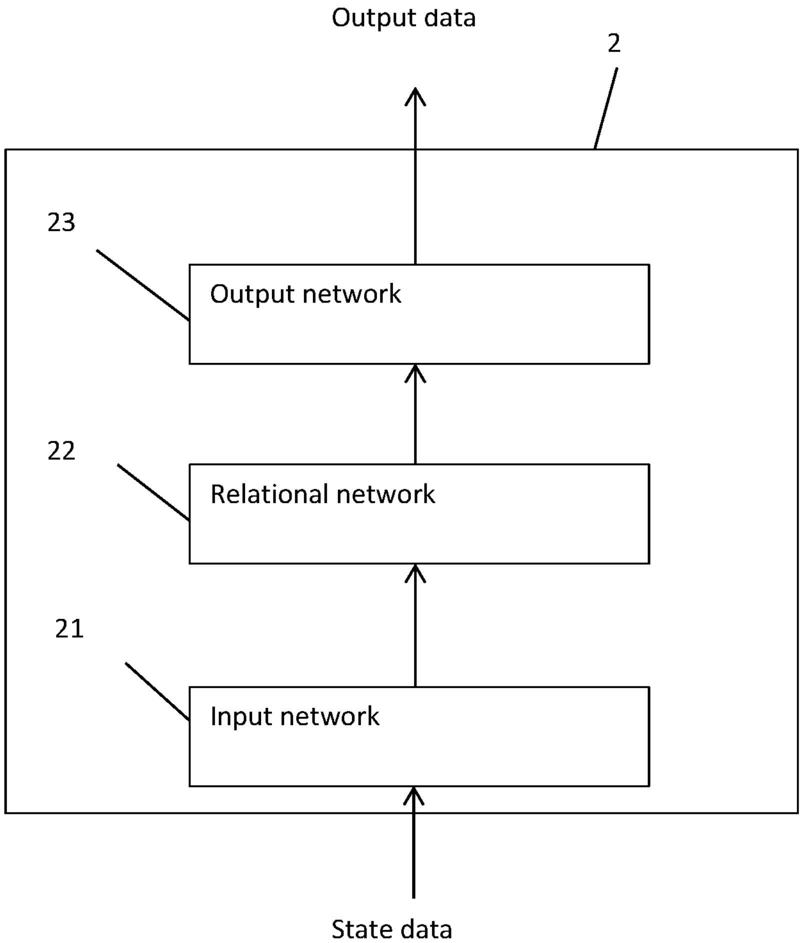
FIG. 2 illustrates a neural network system according to the present specification.

Referring to FIG. 2 a reinforcement learning system is illustrated according to this specification. The reinforcement learning system may be used in the application of FIG. 1. It is a neural network system 2. The system comprises an input network 21 which receives state data, and from it generates sets of entity data describing one or more respective entities in the environment. The neural network system 2 further comprises a relational network 22, which modifies the entity data to generate modified entity data. The neural network system 2 further comprises an output network 23 for generating the output data of the neural network system 2, for use as control data for controlling the agent which acts on the environment.

For simplicity one may consider the case in which the environment is represented by a two-dimensional grid of points, and the input state data is thus a two-dimensional array of data. In one form, the input network 21 may comprise at least one convolutional layer, such as a 2×2 convolutional layer, with stride 1. Furthermore, it may comprise a rectified linear unit (reLU) receiving the output of the convolutional layer.

In one case, the input network 21 may parse pixel inputs into k feature maps of size n×n, where k is the number of output channels of the convolutional layer. x and y coordinates may be concatenated to each k-dimensional pixel feature-vector to indicate the pixel's position in the map. The neural network system 2 may be operative to treat the resulting $n^2$ pixel-feature vectors as the set of entities by compiling them into a $n^2$×k matrix, denoted by as matrix E. This provides an efficient and flexible way to learn representations of the relevant entities, while being agnostic to what may constitute an entity for the particular problem at hand. The number of entities ($n^2$) is denoted N below.

The output network 23 may take many forms. It may, for example, comprise a fully-connected layer, followed by a rectified linear unit (reLU). The output layer may be trained to select a single action. Alternatively, it may be configured to generate a policy defining a distribution of respective probability values for each action of a space of possible actions. A conventional method may be used for training the output network 23. The training may involve a policy gradient method.

Figure 3:
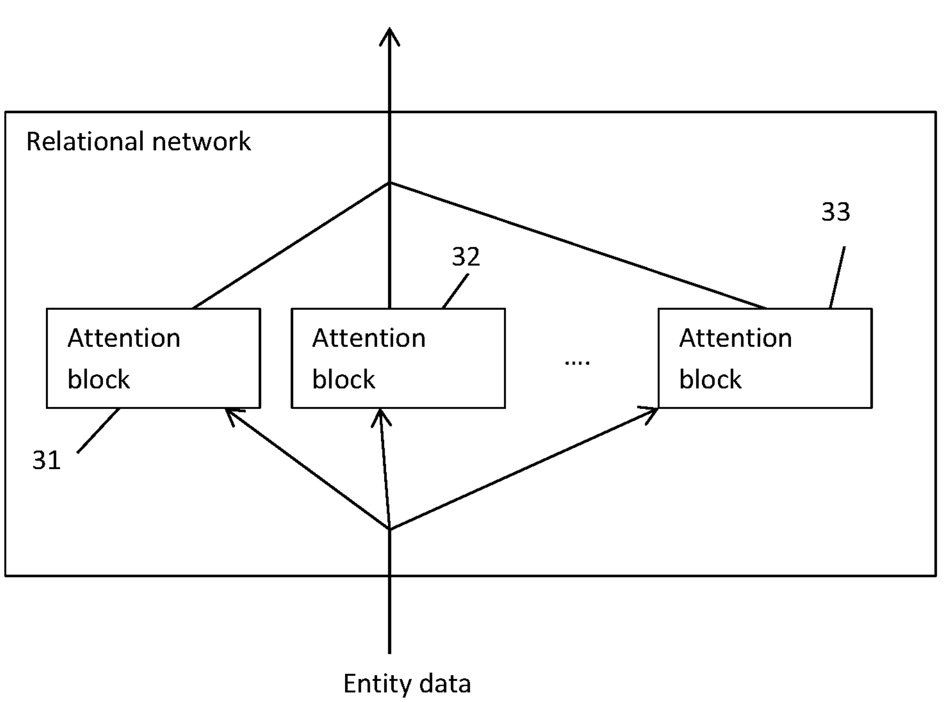
FIG. 3 illustrates a relational network which is a component of the system of FIG. 2.

Turning to FIG. 3, the structure of the relational network 22 is illustrated. It comprises one or more attention blocks 31, 32, 33. As described below, a single attention block performs non-local pairwise relational computations. Optionally, multiple such attention blocks may be provided, with shared (recurrent) or unshared (deep) parameters. Although the attention blocks are illustrated in a parallel, one or more of the attention blocks may alternatively be stacked (i.e., arranged in a sequence with the output of any block except the last being an input to another of the blocks) such that information flows along the sequence. In this case, the multiple blocks may more easily approximate higher-order relations between the entities. Our experiments were mainly performed in the case that the relational network includes only a single attention block.

Figure 4:
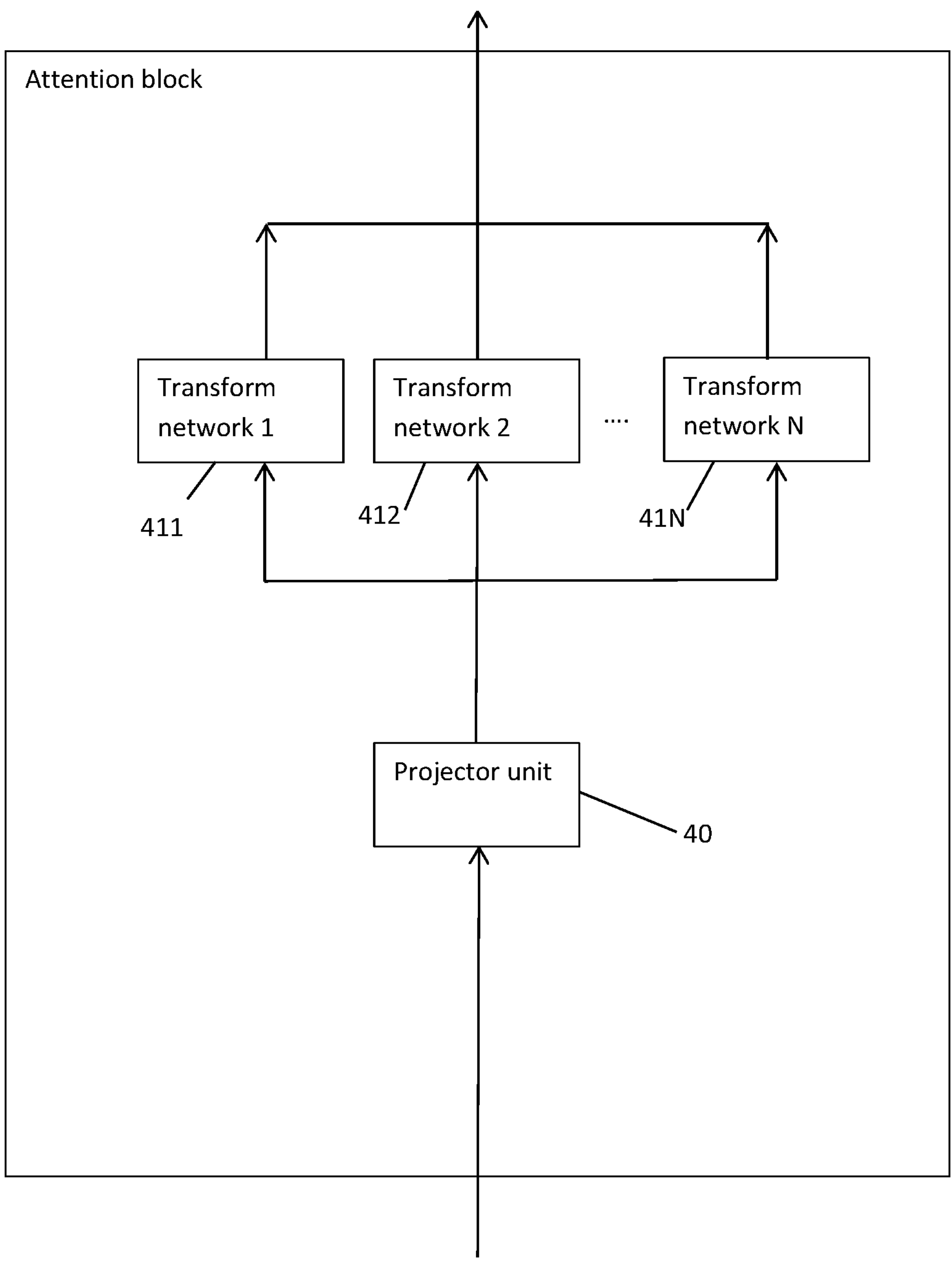
FIG. 4 illustrates an attention block which is a component of the relational network of FIG. 3.

Turning to FIG. 4, the structure of any of the attention blocks of FIG. 3 is illustrated. It comprises a projector unit 40 which receives entity data. This may be entity data from the input network 21 of FIG. 1. Alternatively, in the case of an attention block which is part of a stack of attention blocks, and which is not the first attention block of the stack, the received entity data may be modified entity data generated by another attention block earlier in the stack.

Denoting the number of entities in the environment as N, the received entity data may be denoted $e_1, e_2, \ldots e_N$. The projector unit 40 projects the entity data $e_i$ for each entity (denoted by i) into query, key and value representations $q_i$, $k_i$, and $v_i$ respectively. This is done using respectively a query network, a key network and a value network. The activities of $q_i$, $k_i$, and $v_i$ are typically normalized to have zero mean and unit variance.

In fact, as described below, the projector unit 40 may comprise multiple ("h", where h is an integer greater than one) query networks, key networks and value networks, each producing respective query, key and value representations for each entity. Each of the query networks may be associated with a corresponding one of the value networks and a corresponding one of the key networks, as a set of networks. Thus, there are h sets of networks. A first set of a networks produces values $$q_1^1, k_1^1, v_1^1; q_2^1, k_2^1, v_2^1; \ldots ; q_N^1, k_N^1, v_N^1.$$

A second set of networks produces values $$q_1^2, k_1^2, v_1^2; q_2^2, k_2^2, v_2^2; \ldots ; q_N^2, k_N^2, v_N^2,$$

A plurality of transform networks 411, 412, . . . 41N are provided. Each one is for generating modified entity data for a respective one of the entities, using data relating to other of the entities. For example, transform network 411 generates modified entity data $\widetilde{e_1}$ in respect of the first entity. For simplicity, we will consider here that case that each transform network uses data relating to all the other entities, but in variations of the example this is not the case: each transform data may only use entity data from a corresponding sub-set of the entities. Collectively, the transform networks 411, 412, . . . , 41N generate modified entity data in respect of all the entities.

Figure 5:
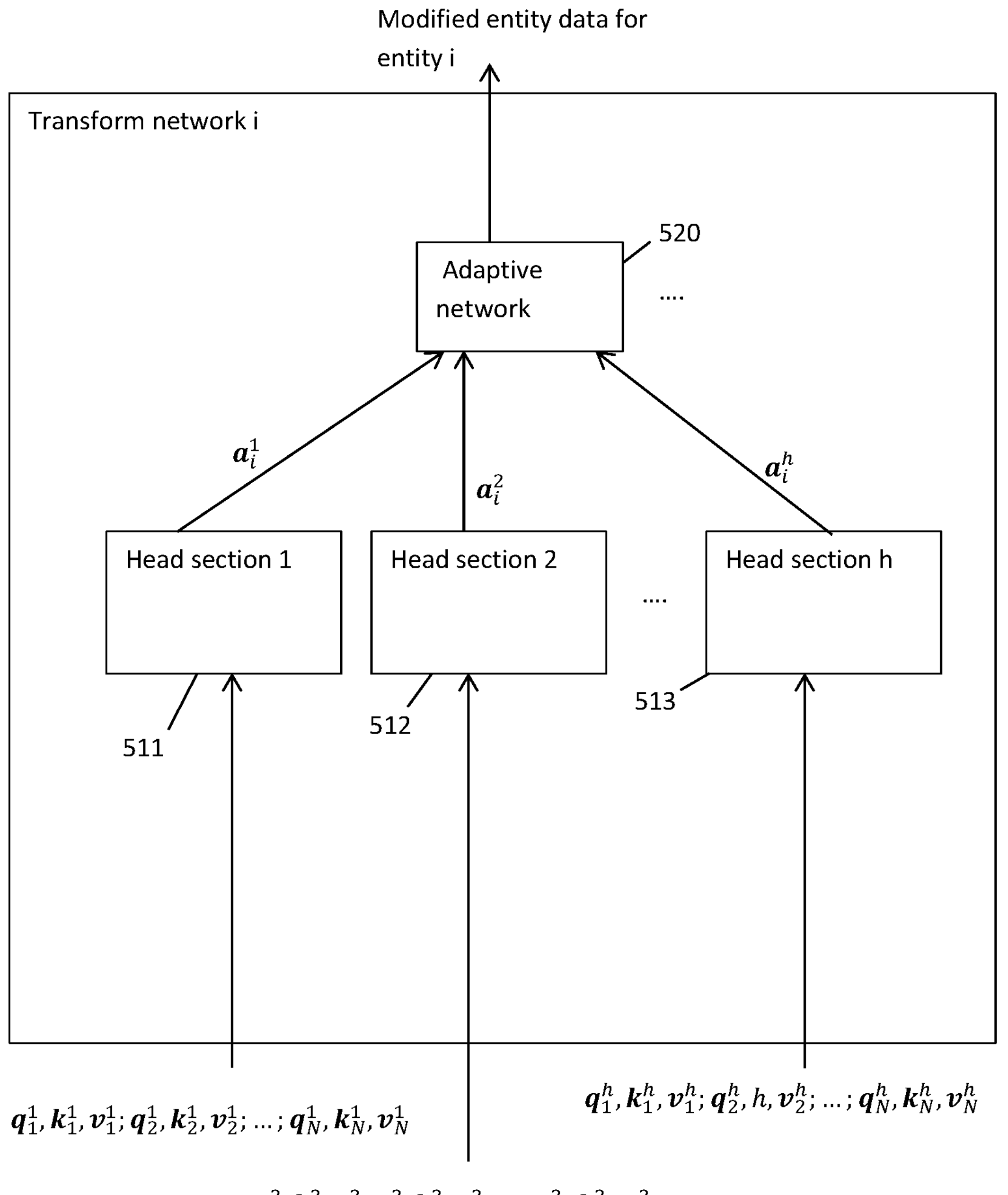
FIG. 5 illustrates a transform network which is a component of the attention block of FIG. 4.

Referring to FIG. 5 the structure of the i-th transform block is illustrated. In includes a number h (which is typically greater than one) of head sections 511, 512, . . . 51*h*. Each generates a respective vector $$a_i^1, a_i^2, \ldots a_i^h$$

by the following procedure.

First, each $q_i$ is compared to all entities' keys $k_{1:N}$ via a dot product. The result are respective unnormalised saliencies, $s_i$, where the vector $s_i$ denotes the set of saliencies $[s_{i,j=1}, s_{i,j=2}, \ldots, s_{i,j=N}]$. The saliencies are normalised into weights, $w_i = \text{softmax}(s_i)$, where $w_i$ denotes a set of N weights for the i-th entity $[w_{i,j=1}, w_{i,j=2}, \ldots, w_{i,j}=N]$. For each entity, the cumulative interactions are computed by the weighted mixture of all entities' value vectors, $$a_i = \sum_{j=1:N} w_{i,j} v_j.$$

This is the output of the head section. It can be compactly computed using maxtrix multiplications as follows:

$$A = \text{softmax}\left(\frac{QK^T}{\sqrt{d}}\right)V$$

where matrices A, Q, K, and V compile the cumulative interactions, queries, keys, and values into matrices, and d is the dimensionality of the key vectors used as a scaling factor.

The vectors $$a_i^1, a_i^2, \ldots a_i^h$$

are concatenated together, and passed to an adaptive network 520. This may be implemented as a multilayer perceptron (2-layer MLP with ReLU non-linearities) with the same layers sizes as $e_i$. The result may be summed with $e_i$ (i.e., there is a residual connection), and transformed via layer normalization, to produce the output of the i-th transform block.

Figure 6:
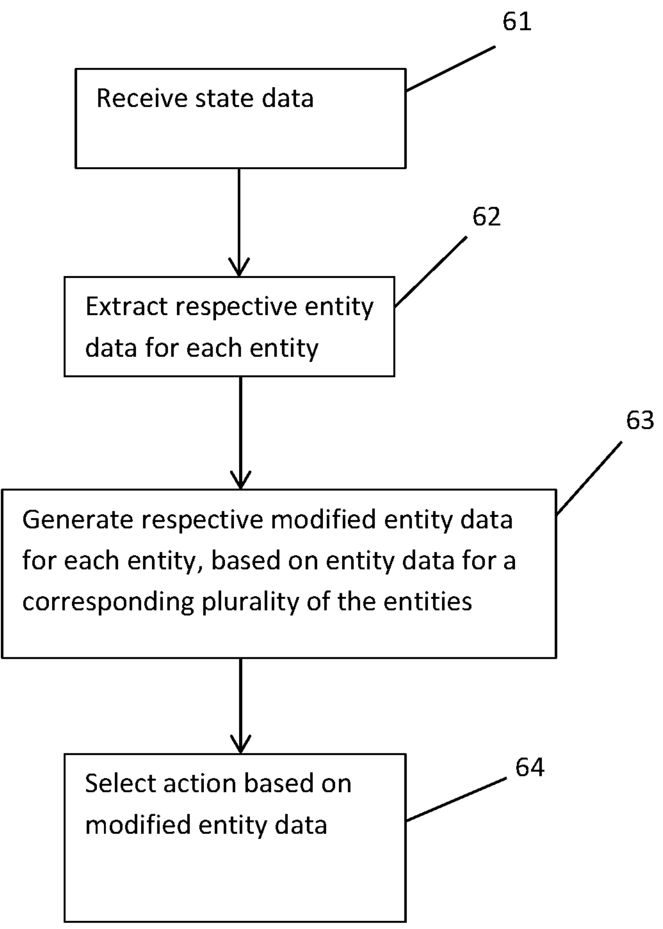
FIG. 6 illustrates steps of a method according to the present specification.

Turning to FIG. 6, the operation of the neural network system of FIG. 2 is described. In step 61, state data is received by the input network 21. In step 62, the input network 21 extracts respective entity data for each of the entities. In step 63, the transform networks of the relational network generate respective modified entity data for each entity, based on entity data for a corresponding plurality of the entities. If the relational network 22 comprises only a single attention block, all the transform networks may operate in parallel. Note that alternatively in the case that there are multiple attention blocks arranged in series, step 61 may include multiple sub-steps, i.e., successively for each of the attention blocks. In step 64, the output networks uses the modified entity data output by the relational network to generate output data for controlling the agent to act on the environment.

The neural network system is trained in a procedure in which each of the h query networks, value networks and key networks of the relational network 22 are adaptively trained. Concurrently, the input network 21 and output network 22 may be trained based on training data which may be in the tuple form explained above in relation to FIG. 1. The training procedure may be performed by a straightforward modification of know reinforcement algorithms.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for controlling an agent in an environment to perform a task, the method comprising:

receiving an observation image characterizing a current state of the environment, wherein the observation image is captured by one or more sensors of the agent or one or more sensors that are located separately from the agent in the environment;

extracting, from the state data and using an input network comprising at least one convolutional layer, respective convolutional features for each of a plurality of spatially distinct image cells in the observation image;

generating respective final features for each of the plurality of spatially distinct image cells in the image by using a relational network having one or more attention blocks, wherein, for each of the plurality of spatially distinct image cells in the image, the relational network that has the one or more attention blocks generates the respective final features for the image cell based on respective convolutional features for the image cell and on respective convolutional features for other image cells in the observation image, wherein the relational network generating the respective final features for the image cell comprises, at each of the one or more attention blocks of the relational network:

determining a respective attention weight between the image cell and each of the plurality of image cells in the observation image; and generating, using the respective attention weights and based on the respective convolutional features for the image cell, respective modified features for the image cell in the observation image;

processing, using an output network, the respective final features for each of the plurality of spatially distinct image cells in the observation image to generate an action selection output that specifies an action to be performed by the agent in response to receiving the observation image; and causing the agent to perform the action specified by the action selection output.

2. The method of claim 1, wherein the attention block comprises:

at least one query network configured to generate as output a query vector for each of the plurality of image cells in the observation image based on applying a query linear transformation to the convolutional features for the cell in the observation image, at least one key network configured to generate a key vector for each of the plurality of image cells in the observation image based on applying a key linear transformation to the convolutional features for the cell in the observation image, and at least one value network configured to generate a value vector for each of the plurality of image cells in the observation image based on applying a value linear transformation to the convolutional features for the cell in the observation image.

3. The method of claim 1, wherein the agent is a mechanical agent and the environment is a real-world environment.

4. The method of claim 3, wherein the agent is a robot.

5. The method of claim 3, wherein the agent is an autonomous or semi-autonomous vehicle.

6. The method of claim 1, wherein the environment is a real-world environment of a service facility comprising a plurality of items of electronic equipment and the agent is an electronic agent configured to control operation of the service facility.

7. The method of claim 1, wherein the environment is a real-world manufacturing environment for manufacturing a product and the agent comprises an electronic agent configured to control a manufacturing unit or a machine that operates to manufacture the product.

8. The method of claim 1, wherein the environment is a simulation of a real-world environment.

9. The method of claim 1, wherein the one or more sensors comprise a camera or a LIDAR sensor.

10. A system comprising one or more computers and one or more storage devices storing instructions that when executed by the one or more computers cause the one or more computers to perform operations comprising:

receiving an observation image characterizing a current state of the environment, wherein the observation image is captured by one or more sensors of the agent or one or more sensors that are located separately from the agent in the environment;

extracting, from the state data and using an input network comprising at least one convolutional layer, respective convolutional features for each of a plurality of spatially distinct image cells in the observation image;

generating respective final features for each of the plurality of spatially distinct image cells in the image by using a relational network having one or more attention blocks, wherein, for each of the plurality of spatially distinct image cells in the image, the relational network that has the one or more attention blocks generates the respective final features for the image cell based on respective convolutional features for the image cell and on respective convolutional features for other image cells in the observation image, wherein the relational network generating the respective final features for the image cell comprises, at each of the one or more attention blocks of the relational network:

determining a respective attention weight between the image cell and each of the plurality of image cells in the observation image; and generating, using the respective attention weights and based on the respective convolutional features for the image cell, respective modified features for the image cell in the observation image;

processing, using an output network, the respective final features for each of the plurality of spatially distinct image cells in the observation image to generate an action selection output that specifies an action to be performed by the agent in response to receiving the observation image; and causing the agent to perform the action specified by the action selection output.

11. The system of claim 10, wherein the attention block comprises:

at least one query network configured to generate as output a query vector for each of the plurality of image cells in the observation image based on applying a query linear transformation to the convolutional features for the cell in the observation image, at least one key network configured to generate a key vector for each of the plurality of image cells in the observation image based on applying a key linear transformation to the convolutional features for the cell in the observation image, and at least one value network configured to generate a value vector for each of the plurality of image cells in the observation image based on applying a value linear transformation to the convolutional features for the cell in the observation image.

12. The system of claim 10, wherein the agent is a mechanical agent and the environment is a real-world environment.

13. The system of claim 12, wherein the agent is a robot.

14. The system of claim 12, wherein the agent is an autonomous or semi-autonomous vehicle.

15. The system of claim 10, wherein the environment is a real-world environment of a service facility comprising a plurality of items of electronic equipment and the agent is an electronic agent configured to control operation of the service facility.

16. The system of claim 10, wherein the environment is a real-world manufacturing environment for manufacturing a product and the agent comprises an electronic agent configured to control a manufacturing unit or a machine that operates to manufacture the product.

17. The system of claim 10, wherein the environment is a simulation of a real-world environment.

18. One or more computer storage media storing instructions that when executed by one or more computers cause the one or more computers to perform operations comprising:

receiving an observation image characterizing a current state of the environment, wherein the observation image is captured by one or more sensors of the agent or one or more sensors that are located separately from the agent in the environment;

extracting, from the state data and using an input network comprising at least one convolutional layer, respective convolutional features for each of a plurality of spatially distinct image cells in the observation image;

generating respective final features for each of the plurality of spatially distinct image cells in the image by using a relational network having one or more attention blocks, wherein, for each of the plurality of spatially distinct image cells in the image, the relational network that has the one or more attention blocks generates the respective final features for the image cell based on respective convolutional features for the image cell and on respective convolutional features for other image cells in the observation image, wherein the relational network generating the respective final features for the image cell comprises, at each of the one or more attention blocks of the relational network:

determining a respective attention weight between the image cell and each of the plurality of image cells in the observation image; and generating, using the respective attention weights and based on the respective convolutional features for the image cell, respective modified features for the image cell in the observation image;

processing, using an output network, the respective final features for each of the plurality of spatially distinct image cells in the observation image to generate an action selection output that specifies an action to be performed by the agent in response to receiving the observation image; and causing the agent to perform the action specified by the action selection output.

* * * * *